United States Patent
Lee et al.

(10) Patent No.: US 9,734,105 B2
(45) Date of Patent: Aug. 15, 2017

(54) APPARATUS AND METHOD FOR CONNECTING MOBILE TERMINAL TO EXTERNAL DEVICE

(71) Applicant: Samsung Electronics Co., Ltd., Gyeonggi-do (KR)

(72) Inventors: One-Gun Lee, Seoul (KR); Woo-Jong Yoo, Gyeonggi-do (KR); Hyun-Ho Park, Seoul (KR); Ju-Pyo Hong, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 167 days.

(21) Appl. No.: 14/197,029

(22) Filed: Mar. 4, 2014

(65) Prior Publication Data

US 2014/0250254 A1    Sep. 4, 2014

(30) Foreign Application Priority Data

Mar. 4, 2013  (KR) .................. 10-2013-0022771

(51) Int. Cl.
| | |
|---|---|
| G06F 13/36 | (2006.01) |
| G06F 13/38 | (2006.01) |
| G06F 3/00 | (2006.01) |
| G06F 1/32 | (2006.01) |
| G06F 13/40 | (2006.01) |

(52) U.S. Cl.
CPC .......... *G06F 13/385* (2013.01); *G06F 1/3203* (2013.01); *G06F 13/4022* (2013.01); *G06F 13/4027* (2013.01)

(58) Field of Classification Search
None
See application file for complete search history.

(56) References Cited

U.S. PATENT DOCUMENTS

| | | | |
|---|---|---|---|
| 2009/0248924 A1 | 10/2009 | Melin | |
| 2010/0109795 A1* | 5/2010 | Jones et al. | ................... 333/101 |
| 2012/0265911 A1* | 10/2012 | Connolly | ...................... 710/300 |
| 2013/0047133 A1* | 2/2013 | Alam | .................. G06F 17/5045 |
| | | | 716/136 |

FOREIGN PATENT DOCUMENTS

KR    10-2010-0106567    10/2010

* cited by examiner

*Primary Examiner* — Henry Tsai
*Assistant Examiner* — Dean Phan

(57) ABSTRACT

An apparatus performs a method for connecting a mobile terminal to an external device. The method includes determining a connection method of the external device among a plurality of connection methods based on values of at least two ports among a plurality of ports included in a connector, and switching at least one switch included in the connection unit so as to connect to the external device according to the determined connection method of the external device.

14 Claims, 7 Drawing Sheets

APPARATUS AND METHOD FOR CONNECTING MOBILE TERMINAL TO EXTERNAL DEVICE

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Mar. 4, 2013 and assigned Serial No. 10-2013-0022771, the entire disclosure of which is incorporated herein by reference.

TECHNICAL FIELD OF THE INVENTION

The present disclosure relates generally to a mobile terminal, and more specifically, to an apparatus and method for connecting to an external device in a mobile terminal.

BACKGROUND OF THE INVENTION

Mobile terminals, such as a smart phone, a tablet Personal Computer (PC), and the like, provide various useful functions to users through various applications. Lately, mobile terminals have evolved to multi-functional devices that allow use of various types of information by providing various additional functions in addition to a voice call. In particular, a mobile terminal connects to an external device to provide a data input/output function of outputting data through the external device or receiving data from the external device.

In order to provide the data input/output function, the mobile terminal should connect to the external device according to a specific connection method. The specific connection method includes a Universal Serial Bus (USB) method and a Mobile High-Definition Link (MHL) method. The MHL method has significantly reduced the 13 lines of a High Definition Multimedia Interface (HDMI) to 3 lines, and has compatibility with a standard micro USB that uses a 5-pin connector. However, the MHL method cannot simultaneously support the USB method and the MHL method. In order to overcome the limitation, a manufacturing company has designed an 11-pin connector for simultaneously supporting the USB method and the MHL method.

However, since a mobile terminal supports either a 5-pin connector or an 11-pin connector, and the mobile terminal with the 5-pin/11-pin connector can connect only to external devices that are supported by the corresponding connector, the mobile terminal has low compatibility with external devices.

Accordingly, there is a need to enable a mobile terminal to simultaneously support a 5-pin connector and an 11-pin connector.

The above information is presented as background information only to assist with an understanding of the present disclosure. No determination has been made, and no assertion is made, as to whether any of the above might be applicable as prior art with regard to the present disclosure.

SUMMARY OF THE INVENTION

To address the above-discussed deficiencies of the prior art, it is a primary object to provide an apparatus and method for connecting to an external device in a mobile terminal such that a plurality of connection methods can be supported through a single connector.

Another aspect of the present disclosure is to provide an apparatus and method for connecting to an external device in a mobile terminal such that the mobile terminal is connected to the external device using at least one method among a plurality of connection methods according to a connection method of the external device.

In accordance with an aspect of the present disclosure, there is provided an apparatus of a mobile terminal configured to connect to an external device. The apparatus includes a connection unit configured to support a plurality of connection methods for connecting to the external device. The apparatus also includes a controller configured to determine a connection method of the external device based on values of at least two ports among a plurality of ports included in a connector, and to switch at least one switch included in the connection unit to connect to the external device according to the connection method of the external device.

In accordance with another aspect of the present disclosure, there is provided a method of connecting to an external device in a mobile terminal. The method includes determining a connection method of the external device among a plurality of connection methods based on values of at least two ports among a plurality of ports included in a connector, and switching at least one switch included in the connection unit in order to connect to the external device according to the connection method of the external device.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication device or system. Hereinafter, embodiments of the present disclosure will be described more fully with reference to the accompanying drawings. While describing the present disclosure, detailed descriptions about related well known functions or configurations that may blur the points of the present disclosure are omitted.

A mobile terminal according to this disclosure is a portable electronic device, and may be a video phone, a mobile phone, a smart phone, an International Mobile Telecommunication 2000 (IMT-2000), a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, E-Book, a portable computer (a notebook, a tablet PC, etc.), a digital camera, or any other suitable device.

Figure 1:
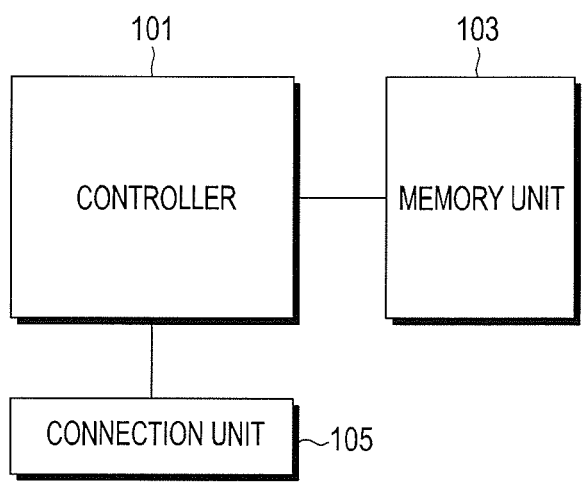
FIG. 1 illustrates a mobile terminal according to an embodiment of this disclosure.

FIG. 1 is a block diagram of a mobile terminal according to an embodiment of the present disclosure.

Referring to FIG. 1, the mobile terminal includes a controller 101, a memory unit 103, and a connection unit 105.

The memory unit 103 includes a program memory and a data memory. The program memory stores a booting system and an Operation System (OS) for controlling the general operation of the mobile terminal, and the data memory stores various data generated while the mobile terminal operates.

Particularly, the memory unit 103 stores the following table in order to determine a connection method of an external device.

TABLE 1

| ADC Port Value | mhl_2_ID Port Value | Result of Determination |
|---|---|---|
| open | Xx | USB Method |
| close | Open | First MHL Method |
| xx | Close | Second MHL Method |

In Table 1, 'open' indicates that an ADC (Analog to Digital Converter) port or a mhl_2_ID port has not connected to an external device, and 'close' indicates that the ADC port or the mhl_2_ID port has connected to an external device. If an ADC port value or a mhl_2_ID port value is 1KΩ, it is determined that the ADC port or the mhl_2_ID port has connected to an external device. Also, 'xx' indicates that the ADC port value or the mhl_2_ID port value is one of 'open' and 'close'.

The first MHL (Mobile High-Definition Link) method is a method of supporting MHL technology through a 5-pin connector, and the second MHL method is a method of supporting the MHL technology through an 11-pin connector. Particularly, the second MHL method can simultaneously support the MHL technology and USB technology.

Also, the connection unit 105 supports a plurality of connection methods, and connects to an external device according to a connection method of the external device among the plurality of connection methods. Here, the external device may be audio visual (AV) equipment, a monitor, a digital television, a USB memory card, and the like.

The controller 101 performs a function of controlling the entire operation of the mobile terminal. Particularly, if the mobile terminal is connected to an external device, the controller 101 detects an ADC port value and a mhl_2_ID port value, determines a connection method of the external device among a plurality of connection methods with reference to Table 1 based on the detected ADC port value and mhl_2_ID port value, and controls the connection unit 105 to connect to the external device according to the determined connection method of the external device.

Figure 2:
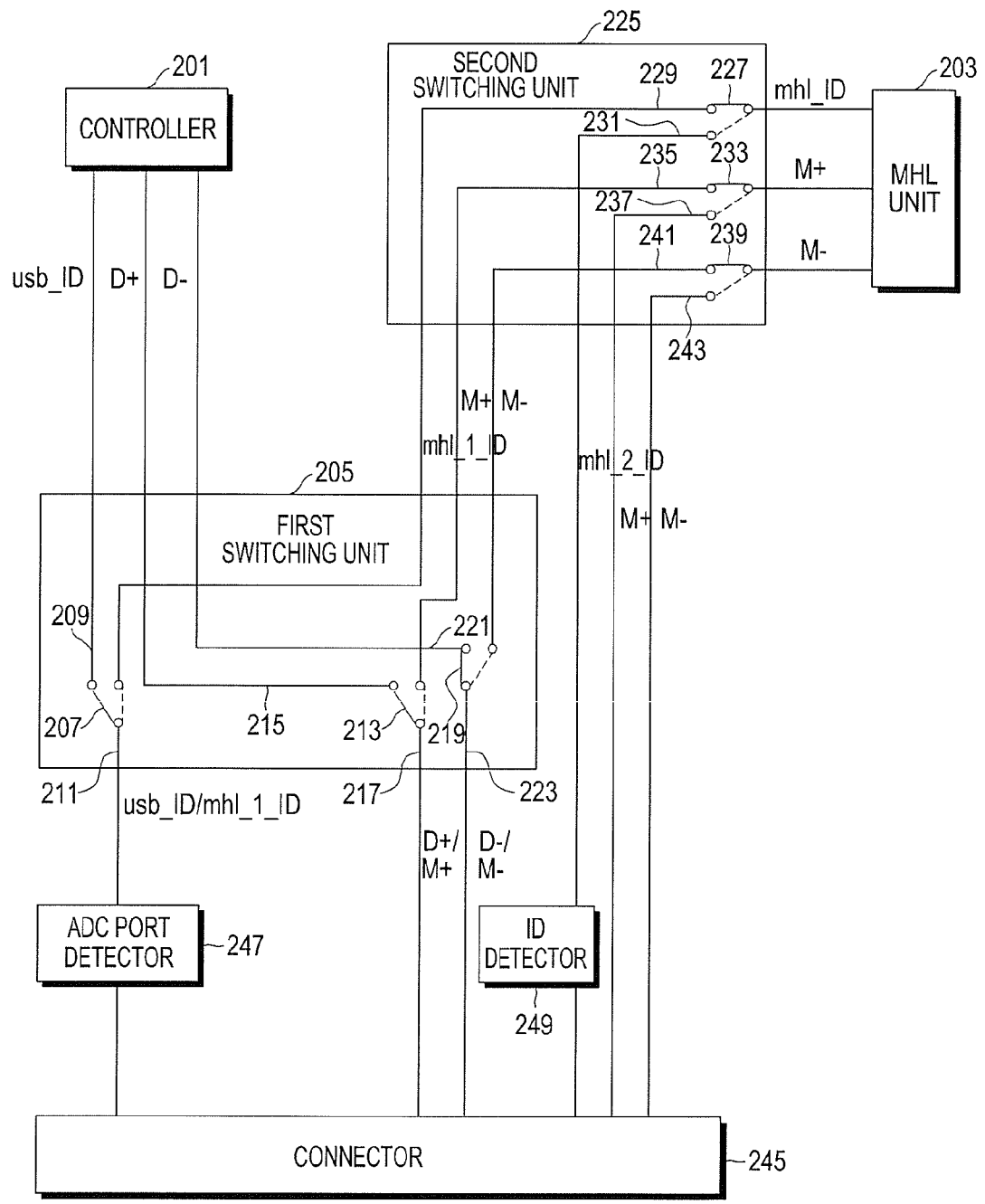
FIG. 2 illustrates a connection unit according to a first embodiment of this disclosure.

FIG. 2 is a block diagram of the connection unit 105 according to a first embodiment of the present disclosure. Hereinafter, operation of a controller 201 and the connection unit 105 will be described with reference to FIG. 2.

Referring to FIG. 2, the connection unit 105 includes a MHL unit 203, a first switching unit 205, a second switching unit 225, a connector 245, an ADC port detector 247, and an ID detector 249.

The connector 245 supports at least one method among the USB method, the first MHL method, and the second MHL method. Particularly, the connector 245 connects the first switching unit 205 to tenth, eleventh, and twelfth lines 211, 217, and 223 (usb_ID/mhl_1_ID, D+/M+, and D−/M−), and connects the second switching unit 225 to seventh, eighth, and ninth lines 231, 237, and 243 (mhl_2_ID, M+, and M−).

Here, the line usb_ID/mhl_1_ID is a line through which USB ID is input/output when an external device supports the USB method or through which mhl_ID is input/output when the external device supports the first MHL method. Also, the lines D+/M+ and D−/M− are lines through which data is input/output using the USB method when the external device supports the USB method or through which multimedia data is input/output using the first MHL method when the external device supports the first MHL method. Also, the line mhl_2_ID is a line through which mhl_ID is input/output when the external device supports the second MHL method. Also, the lines M+ and M− are lines through which multimedia data is input/output using the second MHL method when the external device supports the second MHL method.

Also, the ADC port detector 247 detects a value of an ADC port of the connector 245, and outputs the detected value to the controller 201. The ID detector 249 detects a value of a mhl_2_ID port of the connector 245, and outputs the detected value to the controller 201.

The MHL unit 203 supports a High-Definition Multimedia Interface (HDMI) to which the MHL technology has been applied. Here, the HDMI is one of uncompressed digital video/audio interface specifications. The HDMI provides an interface between a multimedia source (for example, a set-top box, a Digital Versatile Disc (DVD) player, etc.) supporting the HDMI and an apparatus, such as Audio Visual (AV) equipment, a monitor, a digital television, and the like. The MHL is technology for outputting multimedia data from a mobile terminal to an external device. The multimedia data includes video data, game data, and the like. Particularly, the MHL unit 203 transmits multimedia data to the second switching unit 225 through the lines mhl_ID line, M+, and M−. The second switching unit 225 connects the lines mhl_ID, M+, and M− to the MHL unit 203, and switches fourth, fifth, and sixth switches 227, 233, and 239 according to the control of the controller 201 to respectively connect the lines mhl_ID, M+, and M− to the fourth, fifth, and sixth lines 229, 235, and 241 (mhl_1_ID, M+, and M−) or to the seventh, eighth, and ninth lines 231, 237, and 243 (mhl_2_ID, M+, and M−).

Then, the first switching unit 205 connects the controller 201 to the first, second, and third lines 209, 215, and 221 (usb_ID, D+, and D−), connects the second switching unit 225 to the fourth, fifth, and sixth lines 229, 235, and 241 (mhl_ID, M+, and M−), and connects the connector 245 to the tenth, eleventh, and twelfth lines 211, 217, and 223 (usb_ID/mhl_1_ID, D+/M+, and D−/M−). Also, the first switching unit 205 switches the first, second, and third switches 207, 213, and 219 according to the control of the controller 201 to respectively connect the first, second, and third lines 209, 215, and 221 (usb_ID, D+, and D−) to the tenth, eleventh, and twelfth lines 211, 217, and 223 (usb_ID/mhl_1_ID, D+/M+, and D−/M1) or to respectively connect the fourth, fifth, and sixth lines 229, 235, and 241 (mhl_ID, M+, and M−) to the tenth, eleventh, and twelfth lines 211, 217, and 223 (usb_ID/mhl_1_ID, D+/M+, and D−/M−).

Also, the controller 201 performs a function of controlling the entire operation of the mobile terminal. Particularly, the controller 201 receives an ADC port value from the ADC port detector 247 and a mhl_2_ID port value from the ID detector 249, determines a connection method of the external device with reference to Table 1 based on the ADC port value and the mhl_2_ID) port value, and switches the switches of the first switching unit 205 and the second switching unit 225 according to the determined connection method of the external device.

For example, if both the ADC port value and the mhl_2_ID port value are 'open', the controller 201 may determine that the connection method of the external device is the USB method, and switch the first, second, and third switches 207, 213, and 219 of the first switching unit 205 such that the first, second, and third lines 209, 215, and 221 (usb_ID, D+, and D−) are respectively connected to the tenth, eleventh, and twelfth lines 211, 217, and 223 (usb_ID/mhl_1_ID, D+/M+, and D−/M−).

As another example, if the ADC port value is 'close' and the mhl_2_ID port value is 'open', the controller 201 may determine that the connection method of the external device is the first MHL method, switch the first, second, and third switches 207, 213, and 219 of the first switching unit 205 such that the fourth, fifth, and sixth lines 229, 235, and 241 (mhl_ID, M+, and M−) are respectively connected to the tenth, eleventh, and twelfth lines 211, 217, and 223 (usb_ID/mhl_1_ID, D+/M+, and D−/M−), and switches the fourth, fifth, and sixth switches 227, 233, and 239 of the second switching unit 225 such that the lines mhl_ID, M+, and M− are respectively connected to the fourth, fifth, and sixth lines 229, 235, and 241 (mhl_1_ID, M+, and M−).

As another example, if the ADC port value is 'xx' and the mhl_2_ID port value is 'close', the controller 201 may determine that the connection method of the external device is the second MHL method, and switch the fourth, fifth, and sixth switches 227, 233, and 239 of the second switching unit 225 such that the lines mhl_ID, M+, and M− are respectively connected to the seventh, eighth, and ninth lines 231, 237, and 243 (mhl_2_ID, M+, and M−). In this case, if the ADC port value is 'open', the controller 201 may determine that the external device supports both the USB method and the second MHL method, and switch the first, second, and third switches 207, 213, and 219 of the first switching unit 205 such that the first, second, and third lines 209, 215, and 221 (usb_ID, D+, and D−) are respectively connected to the tenth, eleventh, and twelfth lines 211, 217, and 223 (usb_ID/mhl_1_ID, D+/M+, and D−/M−).

Figure 3:
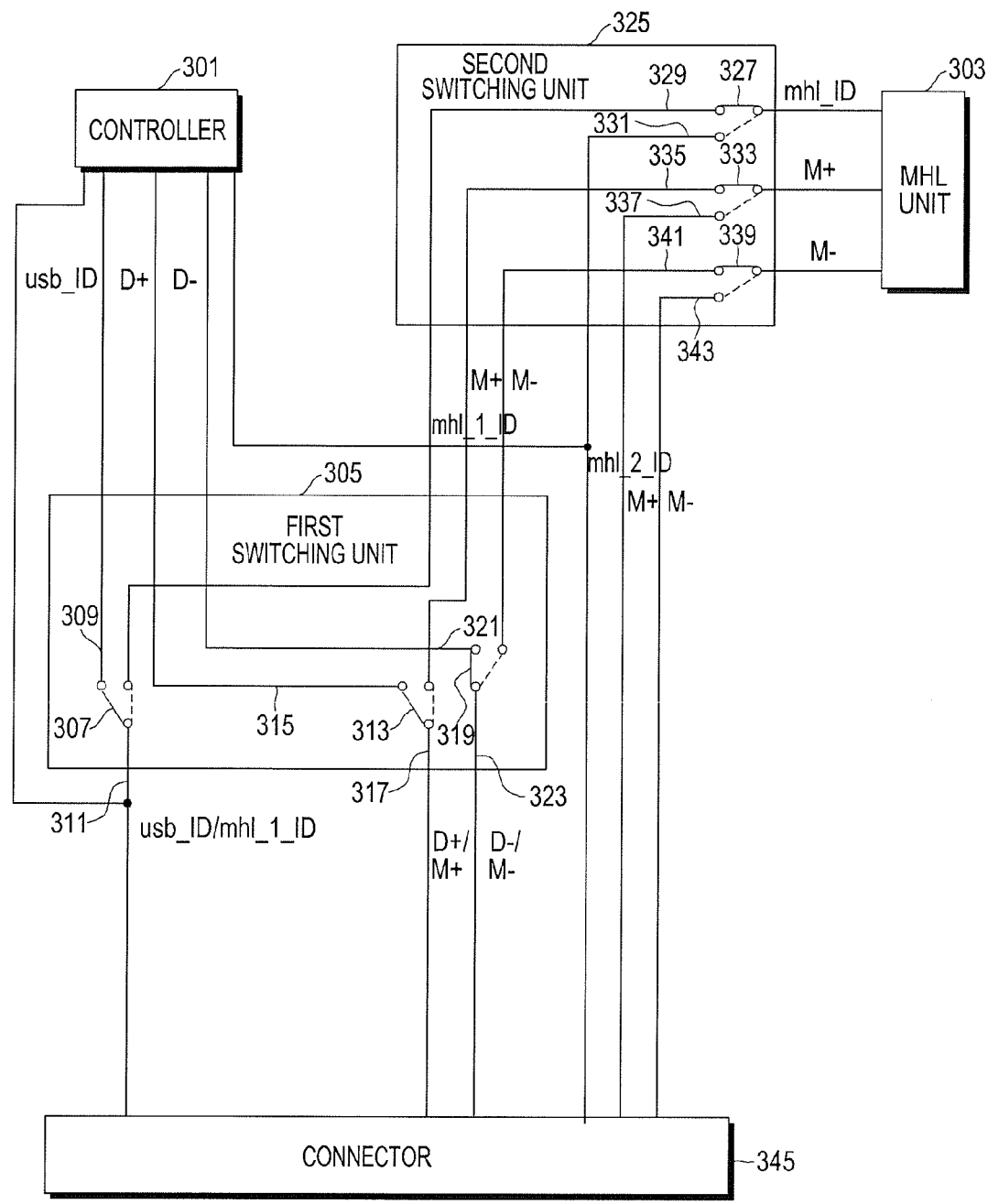
FIG. 3 illustrates a connection unit according to a second embodiment of this disclosure.

FIG. 3 is a block diagram of the connection unit 105 (see FIG. 1) according to a second embodiment of the present disclosure.

Referring to FIG. 3, unlike the configuration of FIG. 2, the connection unit 105 does not include an ADC port detector or an ID detector, and a controller 301 performs the functions of the ADC port detector and the ID detector.

The remaining components of FIG. 3 operate in the same manner as the corresponding ones of FIG. 2, and accordingly, detailed descriptions thereof will be omitted. In more detail, the connection unit 105 of FIG. 3 includes a MHL unit 303, a first switching unit 305, a second switching unit 325, and a connector 345. The MHL unit 303, the first switching unit 305, the second switching unit 325, and the connector 345 perform the same operations of the MHL unit 203, the first switching unit 205, the second switching unit 225, and the connector 245 of FIG. 2.

The controller 301 detects an ADC port value and a mhl_2_ID port value, determines a connection method of an external device with reference to Table 1 based on the ADC port value and the mhl_2_ID port value, and switches the switches of the first and second switch units 305 and 325 of the connection unit 105 according to the determined connection method of the external device.

For example, if both the ADC port value and the mhl_2_ID port value are 'open', the controller 301 may determine that the connection method of the external device is the USB method, and switch first, second, and third switches 307, 313, and 319 of the first switching unit 305 such that the first, second, and third lines 309, 315, and 321 (usb_ID, D+, and D−) are respectively connected to tenth, eleventh, and twelfth lines 311, 317, and 323 (usb_ID/mhl_1_ID, D+/M+, and D−/M−).

As another example, if the ADC port value is 'close' and the mhl_2_ID port value is 'open', the controller 301 may determine that the connection method of the external device is the first MHL method, switch the first, second, and third switches 307, 313, and 319 of the first switching unit 305 such that fourth, fifth, and sixth lines 329, 335, and 341 (mhl_1_ID, M+, and M−) are respectively connected to the tenth, eleventh, and twelfth lines 311, 317, and 323 (usb_ID/mhl_1_ID, D+/M+, and D−/M−), and switch fourth, fifth, and sixth switches 327, 333, and 339 of the second switching unit 325 such that lines mhl_ID, M+, and M− are respectively connected to the fourth, fifth, and sixth lines 329, 335, and 341 (mhl_1_ID, M+, and M−).

As another example, if the ADC port value is 'xx' and the mhl_2_ID port value is 'close', the controller 301 may determine that the connection method of the external device is the second MHL method, and switch the fourth, fifth, and sixth switches 327, 333, and 339 of the second switching unit 325 such that the lines mhl_ID, M+, and M− are respectively connected to seventh, eighth, and ninth lines 331, 337, and 343 (mhl_2_ID, M+, and M−). In this case, if the ADC port value is 'open', the controller 301 may determine that the external device supports both the USB method and the second MHL method, and switch the first, second, and third switches 307, 313, and 319 of the first switching unit 205 such that the first, second, and third lines 309, 315, and 321 (usb_ID, D+, and D−) are respectively connected to the tenth, eleventh, and twelfth lines 311, 317, and 323 (usb_ID/mhl_1_ID, D+/M+, and D−/M−).

Figure 4:
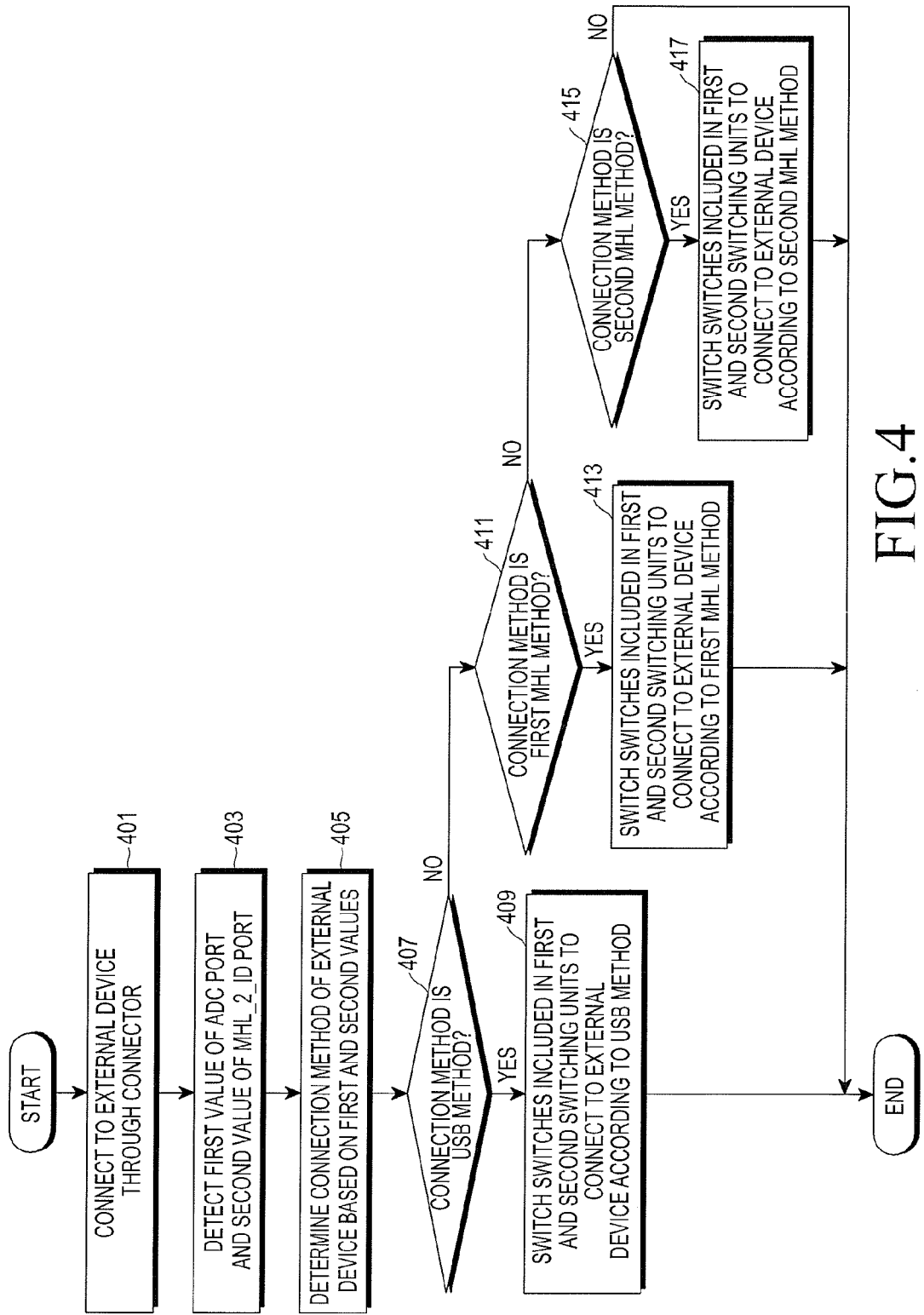
FIG. 4 is a flowchart illustrating a method of connecting a path according to a connection method of an external device in the mobile terminal according to an embodiment of this disclosure.

FIG. 4 is a flowchart illustrating a method of connecting a path according to a connection method of an external device in the mobile terminal according to an embodiment of the present disclosure.

Referring to FIGS. 2 and 4, in operation 401, the controller 201 connects to the external device through the connector 245, and the process proceeds to operation 403. In operation 403, the controller 201 detects an ADC port value as a first value through the ADC port detector 247 and a mhl_2_ID port value as a second value through the ID detector 249, and then the process proceeds to operation 405.

In operation 405, the controller 201 determines a connection method of the external device based on the first and second values, and then the process proceeds to operation 407. For example, if both the first and second values are 'open', the controller 201 may determine that the connection method of the external device is the USB method. As another example, if the first value is 'close' and the second value is 'open', the controller 201 may determine that the connection method of the external device is the first MHL method. As another example, if the first value is 'xx' and the second value is 'close', the controller 201 may determine that the connection method of the external device is the second MHL method.

In operation 407, the controller 201 determines whether the connection method of the external device is the USB method. If it is determined that the connection method of the external device is the USB method, the process proceeds to operation 409; otherwise, the process proceeds to operation 411.

If the process proceeds to operation 409, the controller 201 switches the switches included in the first and second switching units 205 and 225 to connect to the external device according to the USB method. For example, the controller 201 may switch the first, second, and third switches 207, 213, and 219 of the first switching unit 205 such that the first, second, and third lines 209, 215, and 221 (usb_ID, D+, and D−) are respectively connected to the tenth, eleventh, and twelfth lines 211, 217, and 223 (usb_ID/mhl_1_ID, D+/M+, and D−/M−).

If the process proceeds to operation 411, the controller 201 determines whether the connection method of the external device is the first MHL method. If it is determined that the connection method of the external device is the first MHL method, the process proceeds to operation 413; otherwise, the process proceeds to operation 415.

If the process proceeds to operation 413, the controller 201 switches the switches included in the first and second switching units 205 and 225 to connect to the external device according to the first MHL method. For example, the controller 201 may switch the first, second, and third switches 207, 213, and 219 of the first switching unit 205 such that the fourth, fifth, and sixth lines 229, 235, and 241 (mhl_ID, M+, and M−) are respectively connected to the tenth, eleventh, and twelfth lines 211, 217, and 223 (usb_ID/mhl_1_ID, D+/M+, and D−/M−), and switch the fourth, fifth, and sixth switches 227, 233, and 239 of the second switching unit 225 such that the lines mhl_ID, M+, and M− are respectively connected to the fourth, fifth, and sixth lines 229, 235, and 241 (mhl_1_ID, M+, and M−).

If the process proceeds to operation 415, the controller 201 determines whether the connection method of the external device is the second MHL method. If it is determined that the connection method of the external device is the second MHL method, the process proceeds to operation 417; otherwise, operation of connecting to the external device terminates.

If the process proceeds to operation 417, the controller 201 switches the switches included in the first and second switching unit 205 and 225 to connect to the external device according to the second MHL method. For example, the controller 201 may switch the fourth, fifth, and sixth switches 227, 233, and 239 of the second switching unit 225 such that the lines mhl_ID, M+, and M− are respectively connected to the seventh, eighth, and ninth lines 231, 237, and 243 (mhl_2_ID, M+, and M−).

Figure 5:
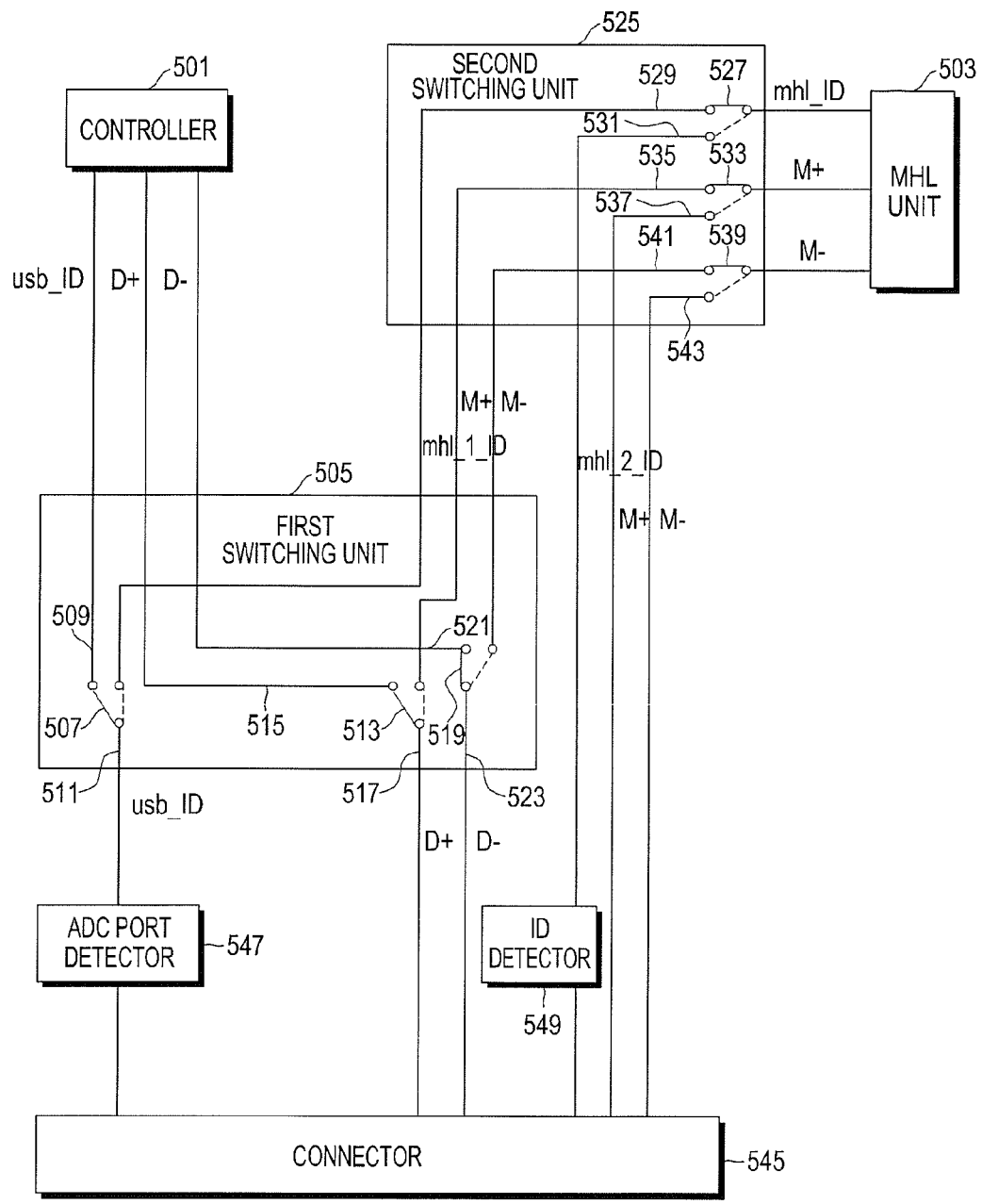
FIG. 5 illustrates a configuration of a connection unit according to an embodiment of this disclosure when the connection unit is connected to an external device according to a Universal Serial Bus (USB) method.

FIG. 5 illustrates a configuration of a connection unit according to an embodiment of the present disclosure when the connection unit is connected to an external device according to the USB method.

Referring to FIG. 5, when the connection unit is connected to the external device through a connector 545, the controller 501 detects an ADC port value as a first value through an ADC port detector 547 and a mhl_1_ID port value as a second value through an ID detector 549. Then, the controller 501 determines a connection method of the external device based on the first and second values.

If it is determined that the connection method is the USB method, the controller 501 switches first, second, and third switches 507, 513, and 519 of a first switching unit 505 such that first, second, and third lines 509, 515, and 521 (usb_ID, D+, and D−) are respectively connected to tenth, eleventh, and twelfth lines 511, 517, and 523 (usb_ID, D+, and D−).

The operations of the MHL unit 503, the second switching unit 525, and switches and lines 527-543 are analogous to those of the MHL unit 202, the second switching unit 225, and the switches and lines 227-243 in FIG. 2, thus a detailed explanation will not be included here.

Figure 6:
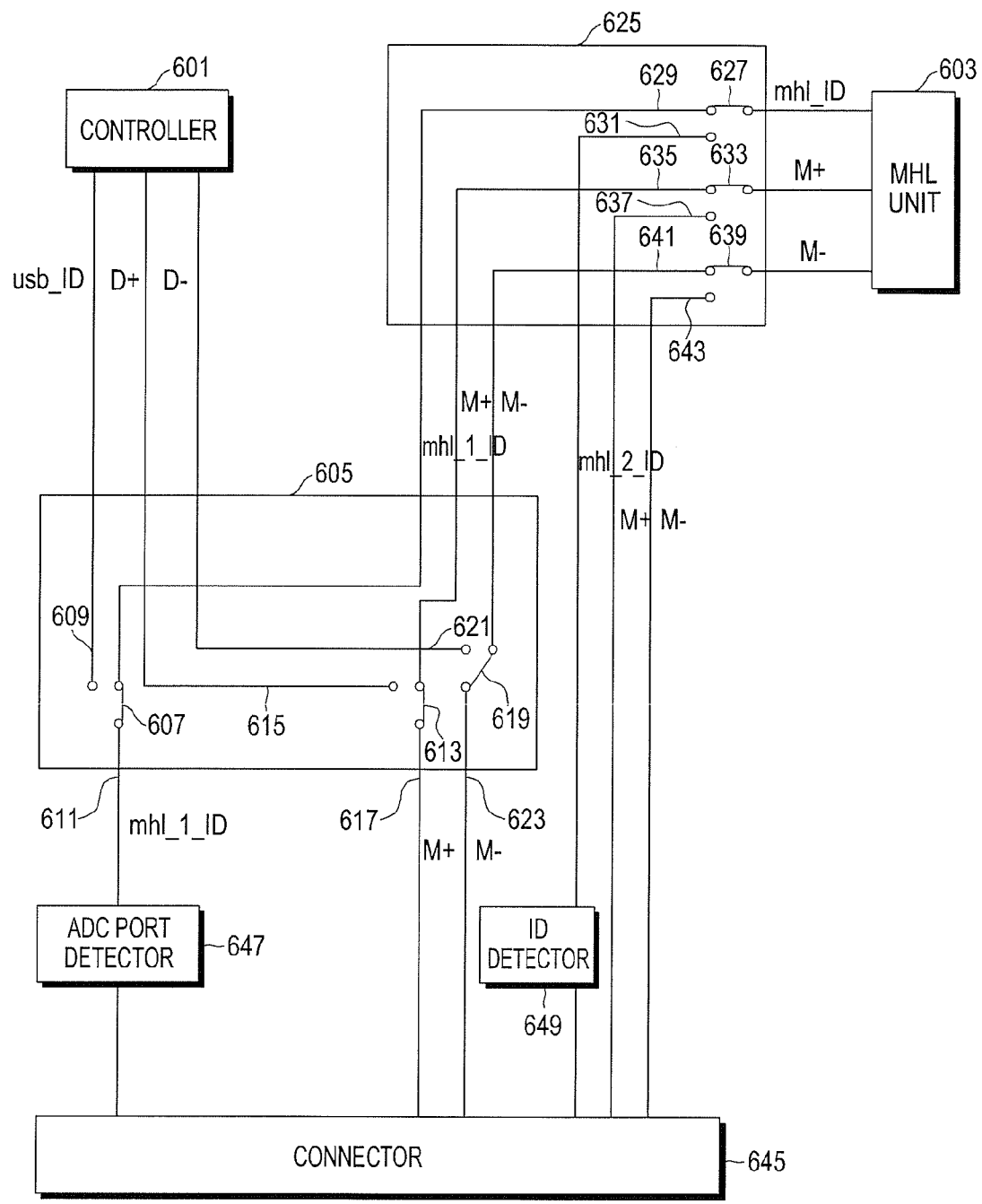
FIG. 6 illustrates a configuration of a connection unit according to an embodiment of this disclosure when the connection unit is connected to an external device according to a first Mobile High-Definition Link (MHL) method.

FIG. 6 illustrates a configuration of a connection unit according to an embodiment of the present disclosure when the connection unit is connected to an external device according to the first MHL method.

Referring to FIG. 6, when the connection unit is connected to the external device through a connector 645, a controller 601 detects an ADC port value as a first value through an ADC port detector 647 and a mhl_2_ID port value as a second value through an ID detector 649. Then, the controller 601 determines a connection method of the external device based on the first and second values.

If it is determined that the connection method is the first MHL method, the controller 601 switches first, second, and third switches 607, 613, and 619 of a first switching unit 605 such that fourth, fifth, and sixth lines 629, 635, and 641 (mhl_ID, M+, and M−) are respectively connected to tenth, eleventh, and twelfth lines 611, 617, and 623 (mhl_1_ID, M+, and M−), and switch fourth, fifth, and sixth switches 627, 633, and 639 of the second switching unit 625 such that the lines mhl_ID, M+, and M− are respectively connected to the fourth, fifth, and sixth lines 629, 635, and 641 (mhl_1_ID, M+, and M−).

The lines 609, 615, 621, 631, 637, and 643 are analogous to the lines 209, 215, 221, 231, 237, and 243 in FIG. 2, thus a detailed explanation will not be included here.

Figure 7:
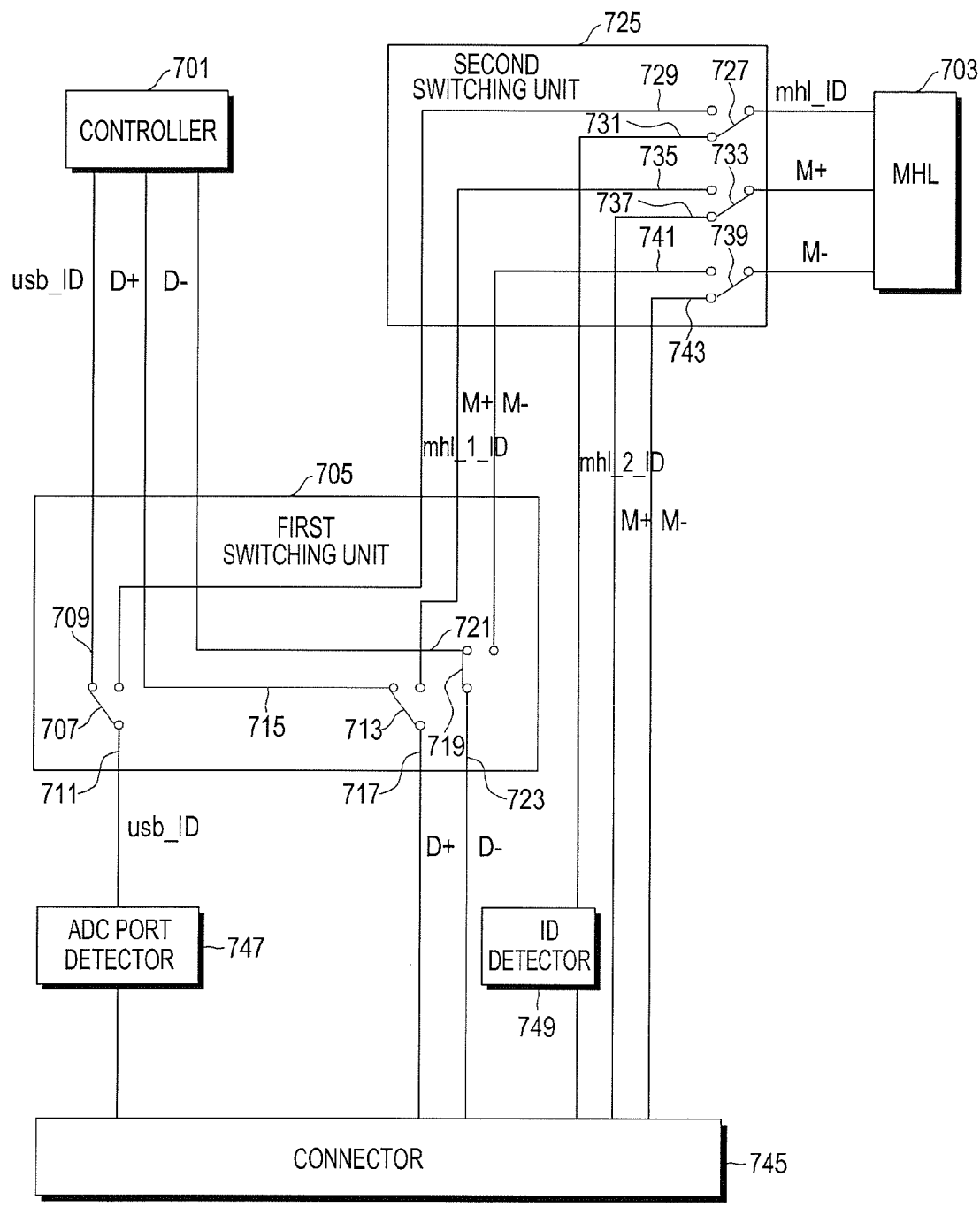
FIG. 7 illustrates a configuration of a connection unit according to an embodiment of this disclosure when the connection unit is connected to an external device according to a second MHL method.

FIG. 7 illustrates a configuration of a connection unit according to an embodiment of the present disclosure when the connection unit is connected to an external device according to a second MHL method.

Referring to FIG. 7, when the connection unit is connected to the external device through a connector 745, a controller 701 detects an ADC port value as a first value through an ADC port detector 747 and a mhl_2_ID port value as a second value through an ID detector 749. Then, the controller 701 determines a connection method of the external device based on the first and second values.

If it is determined that the connection method is the second MHL method, the controller 701 switches first, second, and third switches 707, 713, and 719 of a first switching unit 705 such that fourth, fifth, and sixth lines 729, 735, and 741 (mhl_ID, M+, and M−) are respectively connected to tenth, eleventh, and twelfth lines 711, 717, and 723 (usb_ID, D+, and D−), and switches fourth, fifth, and sixth switches 727, 733, and 739 of a second switching unit 725 such that lines mhl_ID, M+, and M− are respectively connected to the fourth, fifth, and sixth lines 729, 735, and 741 (mhl_1_ID, M+, and M−).

The lines 709, 715, 721, 731, 737, and 743 are analogous to the lines 209, 215, 221, 231, 237, and 243 in FIG. 2, thus a detailed explanation will not be included here.

Therefore, according to the method and apparatus for connecting the mobile terminal to the external device, as described above, by enabling a mobile terminal to support a plurality of connection methods through a single connector, compatibility between the mobile terminal and external devices increases. Also, by enabling a mobile terminal to connect to an external device through a single connector according to at least one method of a plurality of connection methods in correspondence to the connection method of the external device, compatibility between the mobile terminal and the external device increases.

The method of connecting a mobile terminal to an external device, according to this disclosure, can be implemented as computer-readable code in a computer-readable recording medium. The computer-readable recording medium includes all types of recording media in which computer-readable data are stored. Examples of the computer-readable recording medium include a ROM, a RAM, an optical disk, a magnetic tape, a floppy disk, a hard disk, a non-volatile memory, and the like. Further, the recording medium may be implemented in the form of carrier waves such as used in Internet transmission. In addition, the computer-readable recording medium may be distributed to computer systems over a network, in which computer-readable code may be stored and executed in a distributed manner.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus of a mobile terminal configured to connect to an external device, the apparatus comprising:
a controller;
a connection unit configured to support a plurality of connection interfaces for connecting to the external device, wherein the connection unit comprises at least one switch and a connector including a plurality of ports, wherein the connector supports a Universal Serial Bus (USB) interface, a first Mobile High-Definition Link (MHL) interface that supports MHL through a 5-pin connector, and a second MHL interface that supports MHL through an 11-pin connector;
a memory configured to store a table that stores predefined values of at least two ports corresponding to the plurality of connection interfaces,
wherein the controller is configured to:
connect the external device through the connector,
detect values of the at least two ports,
in response to said detecting the values of the at least two ports, determine a connection interface from the plurality of connection interfaces by comparing the predefined values in the table with the detected values of the at least two ports, and
in response to said determining, control the at least one switch to connect to the external device according to the connection interface, and
wherein the connection interfaces of the Universal Serial Bus (USB) interface, the first Mobile High-Definition Link (MHL) interface and the second MHL interface are determined by the value of an Analog-to-Digital Converter (ADC) port and the value of an ID port, and the connection interface is determined as the first Mobile High-Definition Link (MHL) interface if the ADC port is connected and the ID port is not connected.

2. The apparatus of claim 1, wherein the at least two ports comprise an Analog-to-Digital Converter (ADC) port and a mhl-2_ID port for informing whether or not the external device supports the second MHL interface,
wherein the mhl-2_ID port is the ID port corresponding to the second MHL interface.

3. The apparatus of claim 1, wherein if the determined connection interface is the USB interface, the controller switches the at least one switch to respectively connect a usb_ID line, a D+ line, and a D− line to first, second, and third ports among the plurality of ports.

4. The apparatus of claim 1, wherein if the determined connection interface is the first MHL interface, the controller switches the at least one switch to respectively connect a mhl_ID line, a M+ line, and a M− line to first, second, and third ports among the plurality of ports.

5. The apparatus of claim 1, wherein if the determined connection interface is the second MHL interface, the controller switches the at least one switch to respectively connect a mhl_ID line, a M+ line, and a M− line to fourth, fifth, and sixth ports among the plurality of ports.

6. The apparatus of claim 1, wherein if the determined connection interface is a method of simultaneously supporting the USB interface and the second MHL interface, the controller switches the at least one switch to respectively connect a usb_ID line, a D+ line, and a D− line to first, second, and third ports among the plurality of ports, and to respectively connect a mhl_ID line, a M+ line, and a M− line to fourth, fifth, and sixth ports among the plurality of ports.

7. A method of connecting to an external device in a mobile terminal, comprising:
storing a table in a memory, the table comprising predefined values of at least two ports of a connector corresponding to a plurality of connection interfaces comprising a Universal Serial Bus (USB) interface, a first Mobile High-Definition Link (MHL) interface that supports MHL through a 5-pin connector, and a second MHL interface that supports MHL through an 11-pin connector;

connecting the external device through the connector of the mobile terminal, detecting, by a controller, values of the at least two ports of the connector, in response to said detecting the values of the at least two ports of the connector, determining a connection interface by comparing the predefined values in the table with the detected values of the at least two ports, and in response to said determining, controlling at least one switch to connect to the external device according to the determined connection interface, and wherein determining the connection interfaces of the Universal Serial Bus (USB) interface, the first Mobile High-Definition Link (MHL) interface and the second MHL interface are based on the value of an Analog-to-Digital Converter (ADC) port and the value of an ID port, and the connection interface is determined as the first Mobile High-Definition Link (MHL) interface if the ADC port is connected and the ID port is not connected.

8. The method of claim 7, wherein the at least two ports comprise an Analog-to-Digital Converter (ADC) port and a mhl-2_ID port for informing whether or not the external device supports the second MHL interface, wherein the mhl-2_ID port is the ID port corresponding to the second MHL interface.

9. The method of claim 7, wherein the controlling the at least one switch comprises switching the at least one switch to respectively connect a usb_ID line, a D+ line, and a D− line to first, second, and third ports among the at least two ports, if the determined connection interface is the USB interface.

10. The method of claim 7, wherein the controlling the at least one switch comprises switching the at least one switch to respectively connect a mhl_ID line, a M+ line, and a M− line to first, second, and third ports among the at least two ports, if the determined connection interface is the first MHL interface.

11. The method of claim 7, wherein the controlling the at least one switch comprises switching the at least one switch to respectively connect a mhl_ID line, a M+ line, and a M− line to fourth, fifth, and sixth ports among the at least two ports, if the determined connection interface is the second MHL interface.

12. The method of claim 7, wherein the controlling the at least one switch comprises switching the switch to respectively connect a usb_ID line, a D+ line, and a D− line to first, second, and third ports among the at least two ports, and to respectively connect a mhl_ID line, a M+ line, and a M− line to fourth, fifth, and sixth ports among the at least two ports, if the determined connection interface is an interface of simultaneously supporting the USB interface and the second MHL interface.

13. A mobile terminal configured to connect to an external device, the mobile terminal comprising:

transceiver circuitry configured to transmit and receive signals;

a connection unit configured to support a plurality of connection interfaces for connecting to the external device, wherein the connection unit comprises at least one switch and a connector including a plurality of ports, wherein the connector supports Universal Serial Bus (USB) interface, a first Mobile High-Definition Link (MHL) interface that supports MHL through a 5-pin connector, and a second MHL interface that supports MHL through a 11-pin connector;

a memory configured to store a table that stores predefined values of at least two ports corresponding to the plurality of connection interfaces; and a controller configured to:

connect the external device through the connector, detect values of the at least two ports, in response to said detecting the values of the at least two ports, determine a connection interface from the plurality of connection interfaces by comparing the predefined values in the table with the detected values of the at least two ports, and in response to said determining, control the at least one switch to connect to the external device according to the connection interface, and wherein the connection interfaces of the Universal Serial Bus (USB) interface, the first Mobile High-Definition Link (MHL) interface and the second MHL interface are determined by the value of an Analog-to-Digital Converter (ADC) port and the value of an ID port, and the connection interface is determined as the first Mobile High-Definition Link (MHL) interface if the ADC port is connected and the ID port is not connected.

14. The mobile terminal of claim 13, wherein the at least two ports comprise an Analog-to-Digital Converter (ADC) port and a mhl-2_ID port for informing whether or not the external device supports the second MHL interface, wherein the mhl-2_ID port is the ID port corresponding to the second MHL interface.

* * * * *